United States Patent [19]
Pasbrig

[11] 3,810,703

[45] May 14, 1974

[54] RELEASABLE JOINTS WITH MALE AND FEMALE ELEMENTS

[76] Inventor: Max Pasbrig, Casa Luce-Via all'Eco, Orselina, Switzerland

[22] Filed: June 15, 1970

[21] Appl. No.: 46,203

[30] Foreign Application Priority Data
June 20, 1969  Germany............................ 1931492
Oct. 24, 1969  Germany............................ 2002193
Jan. 19, 1970  Germany............................ 6941516

[52] U.S. Cl. ............................. 403/324, 403/328
[51] Int. Cl. ............................................. F16b 7/00
[58] Field of Search ............ 287/53, 103 A; 85/5 B; 24/211, 110, 230 LP; 279/79, 80, 82, 29, 30, 22, 75; 403/324, 328, 378

[56] References Cited
UNITED STATES PATENTS
| | | | |
|---|---|---|---|
| 1,618,851 | 2/1927 | Thunberg et al. | 85/5 B |
| 1,316,217 | 9/1919 | Beckwith | 279/22 UX |
| 1,421,792 | 7/1922 | Linden | 279/22 UX |
| 751,345 | 2/1904 | Saunders | 279/22 |
| 1,526,565 | 2/1925 | Redmond | 279/22 |
| 1,590,337 | 6/1926 | Witte | 24/110 |

Primary Examiner—Andrew V. Kundrat

[57] ABSTRACT

The invention relates to a releasable male and female joint in which the male and female parts can be slid one into the other and held in connected condition by means of locking means. The locking means are arranged in the male or the female element and comprise at least one sprag or locking body which is arranged in a recess in the element so as to be able to move axially. A compression spring, also arranged in the recess serves to urge the sprag partially out of the recess. The projecting part of the sprag is arranged to engage an abutment provided on the other of the two elements. For undoing the joint releasing means are provided by means of which the sprag can be pressed back into the hole against the action of the associated compression spring and brought out of engagement with the abutment.

16 Claims, 11 Drawing Figures

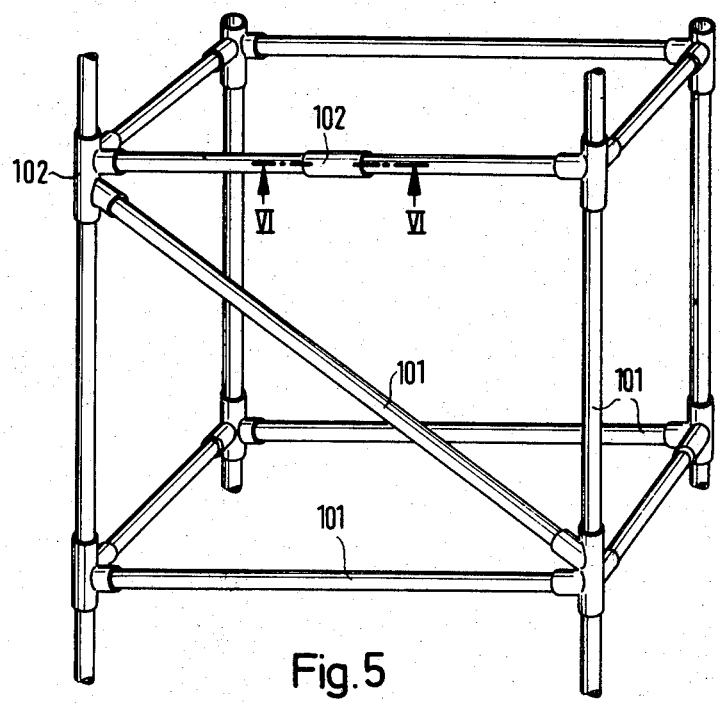
Fig. 5
Fig. 6
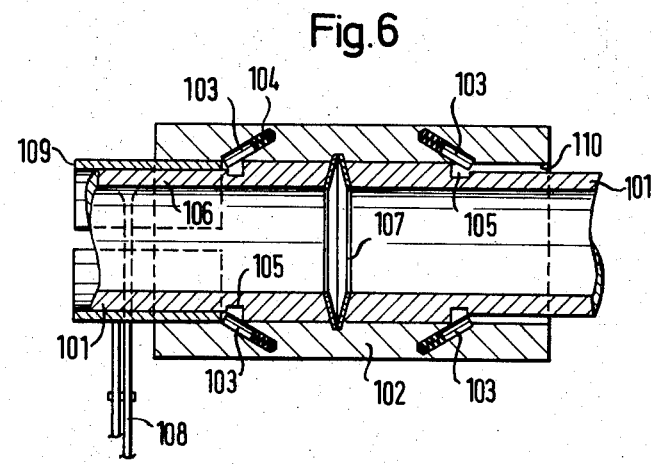

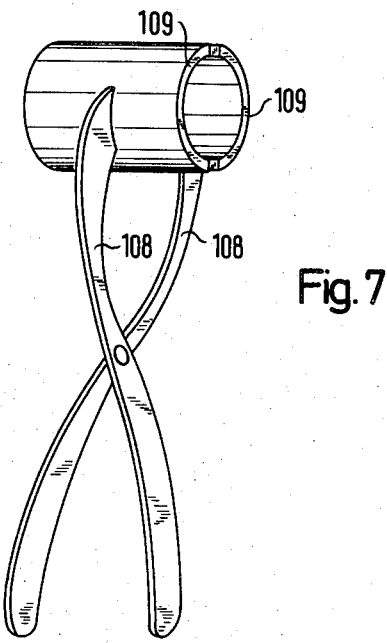
Fig. 7
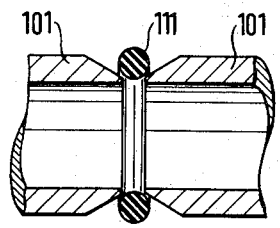
Fig. 8
Fig. 9
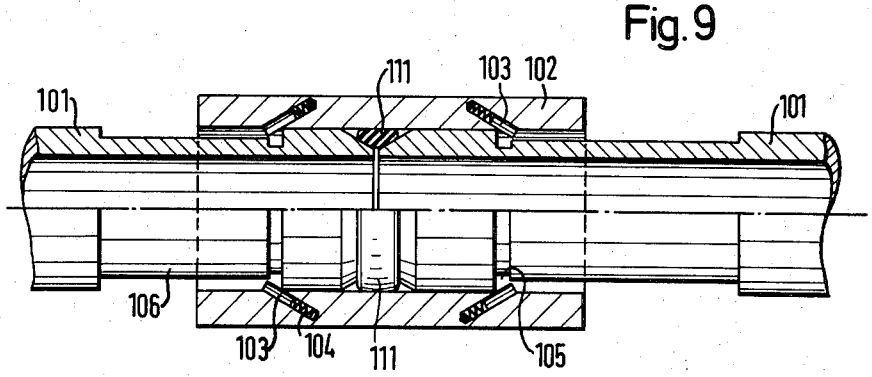

RELEASABLE JOINTS WITH MALE AND FEMALE ELEMENTS

BACKGROUND OF INVENTION

1. Field to which invention relates

The present invention relates to releasable joints with male and female elements and more particularly to such joints with inner and outer connecting elements which can be fitted one inside the other at least partially and are connected by means of a locking arrangement which comprises locking means arranged in one of the elements. The locking elements lie against an abutment arranged in the other connecting element and a releasing element is provided by means of which the locking element and the abutment can be brought out of engagement in order to release the joint.

2. The prior art

Releasable male and female joints for electric contacts are known in which two connecting elements are provided which are connected by means of a locking element arranged in the one connecting element. The locking element lies against an abutment arranged in the other connecting element and means are provided by means of which, for undoing the joint, the locking element and the abutment can be brought out of engagement. A disadvantage in this construction is that the connection together of the two connecting elements is only possible in a certain position and that in the case of the application of substantial tensile forces there is the danger of the joint coming undone unintentionally, since the end of the strip spring like locking element, which is constructed in the form of the cooperating hook, comes out of engagement with the abutment.

However even in the case of a another previously proposed male and female joint or connection for electrical contacts there is the disadvantage that the construction is not sufficiently secure against the application of tensile forces. A further disadvantage is that satisfactory undoing of the joint is not always possible.

Furthermore non-electrical disconnectable male and female joints have been proposed comprising two connecting elements of which one is approximately sleeve-shaped and contains a spring loaded sprag. The inner pin-like male element is arranged in the through-hole inside the female sleeve-shaped element. The male element is provided with a recess into which the sprag is urged by its spring so that the two parts of the joint are connected without any possibility of axial movement in relation to each other. However this male and female joint has the disadvantage that once the male element has been inserted into the female element so that the two elements are locked together axially it is not possible to undo the joint.

SUMMARY OF INVENTION

One objective of the invention is to provide an improved releasable male and female joint which despite universal applicability is to be simple and robust. A further objective of the invention is to provide a male and female joint whose unintentional release is impossible despite the application of high tensile forces. A still further objective of the invention is to provide a male and female joint or connection which can be undone or released in a very simple and rapid manner.

In the case of the releasable male and female joint in accordance with the invention, in which the male element can be slid at least partially into the female element, the locking means comprise at least one sprag, which is arranged in a recess or hole in one of the elements for axial shifting movement, a spring being arranged in the recess or hole which presses the sprag so that a certain part of it projects out of the hole and lies against an abutment arranged in the other element. For undoing the male and female joint the sprag can be pressed against the pressure of the associated compression spring in the recess so as to slide inwards into the recess and come out of engagement with the abutment.

Although the releasable male and female joint constructed in accordance with the invention is of completely universal application, preferred fields of application include electrical contact connections, tube connections, and male and female connections for connecting boards and planks in cupboards and sets of shelves.

Particular advantages occur in the case of the above-mentioned tube connections since in accordance with the invention the screws and the like needed in the case of known tube connections are not required. Such screws are relatively expensive and driving them is time consuming. The connection together and undoing of the tube connection in accordance with the invention is carried out with only one single movement of the hand. Since in accordance with the invention the joint between the two tubes can readily be sealed, the tubes are not only suitable for the construction of scaffolding and platforms of all different types, but also for the transport of liquids or gases.

LIST OF SEVERAL VIEWS OF DRAWINGS

Further details and features of the invention will appear from the following description and preferred embodiments of the invention reference being had to the accompanying drawings.

FIG. 5 shows a first example of application of a male and female joint or connection constructed in accordance with the invention for connecting tubes.

FIG. 6 is a section on the line VI—VI in FIG. 5.

FIG. 7 is a perspective view of a wrench or pincers for undoing a tube connection in accordance with the invention.

FIG. 8 shows diagrammatically a sealing arrangement between abutting tube ends.

FIG. 9 is a section through a male and female joint between tubes for carrying liquids and/or gases.

DESCRIPTION OF PREFERRED EMBODIMENTS

Figure 1:
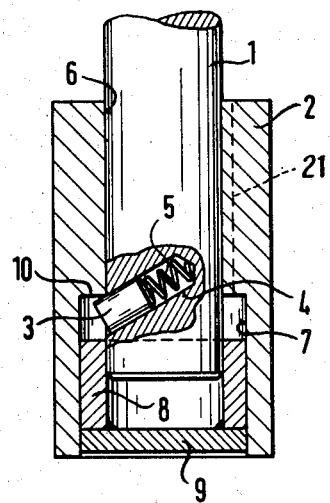
FIG. 1 is a section indicating the principle of the invention, through a first preferred embodiment of the invention.

The two joint or connecting elements are denoted by reference numerals 1 and 2. The generally pin-shaped male element 1 is provided with a sprag 3 forming the locking means. The sprag is arranged in a hole 4 or recess which is oblique in relation to the longitudinal axis of the connecting element 1 and is acted upon by a compression spring 5 which is also arranged in the hole 4. Preferably the hole is blind. The female element 2, which can be sleeve-shaped as indicated in the drawing is provided with a recess which as shown is preferably a through-hole 6. The through-hole 6 is made in accordance with the size and shape of the male element 1, that is to say a slight degree of play is arranged between the two elements in a radial direction. The through-hole 6 is provided with a hole or broadened portion 7 and is concentric in relation to the rest of the hole 6. Within the hole 7 forming the broadened out part a sleeve 8 is arranged which is used to disconnect the male and female joint. The sleeve 8 surrounds the male element 1 and engages it positively. The sleeve 8 is connected with a plate 9, preferably integrally as shown. The plate 9 is fitted in the hole 7 and can be moved by the application of external pressure within the hole 7 in relation to the male element 1. The plate 9 and the sleeve 8 connected with it is held against falling out of the hole 7 either by friction or by positively acting means, not shown, for instance in the form of projections partially fitting round the plate 9 and attached to the female element 2 so as to engage the plate 9 externally.

The manner of operation of the above-described arrangement is as follows.

On inserting the male element 1 into the female element the movement of the male element in the through-hole 6 of the female element 2 presses back the sprag 3 against the action of the spring 5 into the oblique hole 4. When the sprag approaches the hole 7 it can snap into the hole under the action of the spring 5 and comes to lie behind a radial wall part of the hole 7. The wall part thus constitutes an abutment 10. After the sprag 7 snaps into position, the two connecting elements 1 and 2 are held against disengagement by the action of a tensile force.

For undoing the male and female joint the plate 9 with the sleeve 8 is pressed into the hole 7 of greater diameter from the outside so that the sprag 3 is pressed by the sleeve 8 against the action of the spring 5 into the oblique hole 4 completely. The male element 1 can then be drawn out of the through-hole 6 of the female element 2.

Figure 2:
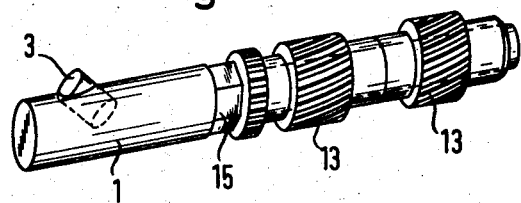
FIG. 2 is a perspective view of a second preferred construction.
Figure 3:
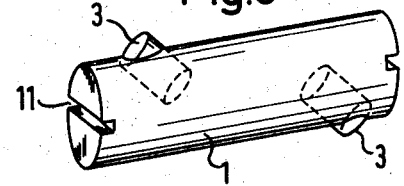
FIG. 3 is a perspective view of a third preferred embodiment of the invention.
Figure 4:
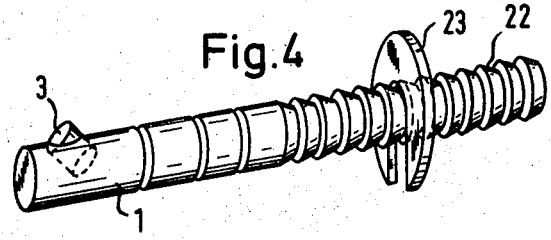
FIG. 4 is a perspective view of a fourth preferred embodiment of the invention.

Since the embodiments in accordance with FIGS. 2 to 4 are very similar to that shown in FIG. 1 the following description of them can be very brief, especially as all corresponding parts are denoted by the same reference numerals.

In FIGS. 2 to 4 three embodiments of the pin-shaped male element 1 are shown, there being no representation of the other approximately sleeve-shaped female element. The left hand part in FIGS. 2 to 4 - with the exception of a slot 11 in FIGS. 3 — is the same as the corresponding part in FIG. 1. The right hand part serves for the attachment of the pin-like male element 1, for example on a wall. For this purpose two sleeves of plastic material 13 are provided which are arranged on the right hand part of the male element 1 and are held against rotation and axial displacement. The sleeves 13 of plastics material have on their outer periphery a helical grooves and in the assembled condition firmly engage the bore of a hole in a wall. In order to turn the connecting element 1 in relation to the sleeves 13 of plastics material fixed in the wall, a section 15 with a hexagonal cross-section is provided for gripping with a wrench. By turning the connecting male element 1 in relation to the sleeve-like female element 2 the sprag 3 can be brought into alignment with a continuous longitudinal groove 21 in the inner wall of the through-hole 6 in the female element 2 so that the two elements 1 and 2 can be moved axially in relation to each other for undoing the male and female joint. The longitudinal groove 21 is shown in broken lines in FIG. 1 and is at least as deep as the end of the sprag 3 extending out of the hole 4.

The sleeve-like female element 2 can also be inserted in a hole of suitable diameter in a wall loosely and provided with axially extending continuous longitudinal slots at its end removed from the male element. These slots, which extend axially approximately along the axial length of the hole 7 of enlarged diameter, provide resilient tongue-like projections. In an alternate embodiment, the hole 7 of greater diameter is conical and can receive a circular washer. The annular abutment 10 for the sprag 3 can run helically in the peripheral direction. If now the connecting element 1 is turned, the sprag 3 moves on the helical abutment 10 so that the male element 1 is displaced in the axial direction in relation to the female element 2. As a result the two walls, which each have one of the two elements in them, can be drawn together.

In the case of the embodiment of the invention in accordance with FIG. 3 the male element 1 is in the form of a so-called double connector and is provided with opposite sprags 3. The one sprag cooperates with a female element 2 which, apart from the washer, is constructed in exactly the same manner as the first mentioned connecting element. Apart from the above-mentioned female connecting element 2 a further upper connecting element 2 is provided which is connected with the other wall and has a continuous longitudinal groove (see FIG. 1).

For turning the connecting element 1 the above-mentioned slot 11 is provided which serves for engagement with a screwdriver. For disconnecting the male and female joint the groove is brought into alignment with the associated sprag 3.

In the case of the embodiment in accordance with FIG. 4 the right hand end of the connecting element 1 is provided with several grooves 22 for connecting with a building component; this connection is carried out, as is shown in FIG. 4, using a slotted washer 23. Since several grooves are present, different distances can be set.

For the assembly of the individual parts of desks the individual pin-like male elements can be arranged in the factory in the vertical side walls of the desks in any fixed manner, while the corresponding sleeve-like female elements are also placed in the factory in the rear wall. Assembly of the rearwall with the rest of the desk can then be carried out by a simple pressing movement.

The sprags are generally in the form of short solid cylindrical plugs or pegs whose external diameter corresponds to the internal diameter of the oblique hole. The outer end of the oblique hole is tapered to ensure that the sprags are not moved completely out of the holes by the associated compression springs. A particularly simple manner of manufacturing elements with such narrowing holes is to place a center punch against the outer end of the oblique hole so that the edge of the hole is displaced inward and thus made narrower.

It is advantageous if the oblique position of the hole accepting the sprag is so chosen that when tensile forces come into play the sprag is not urged into the hole but out of it so that in a very simple manner absolute security against unintentional undoing of the joint is provided for.

In certain cases the hole containing the sprag can also make a right angle to the longitudinal axis of the pinlike male element. In this case the outer end of the sprag must be wedge shaped in order to make it possible to press the sprag inwardly when the male element is inserted into the female element.

As can readily be seen the invention involves the advantage that a very simple and cheap male and female joint is provided with which components of the most various different kinds can be connected together rapidly. Furthermore there is the advantage that the male and female joint is very robust and can resist not only substantial tensile forces but also perpendicularly directed shear loads.

In its simplest form a male and female joint in accordance with the invention comprises the pin-shaped male element with a spring loaded sprag and an annular disc, the sprag lying in the assembled condition against a radial face on the annular disc which forms the abutment.

The male and female joint in accordance with the invention (see especially FIG. 1) is also very suitable for various types of electrical contact connections. The preferred range of application in this respect includes electrical plugs and sockets. Such sockets and plugs in accordance with the invention have the advantange over known devices that unintentional undoing is excluded with certainty even in the case of the application of a tensile force. In the case of such a coupling the two connecting elements denoted by reference numerals 1 and 2 in FIG. 1, form the parts in the socket and in the plug. The part 1 in this case preferably only serves for providing a mechanical connection and does not serve for carrying electrical current. It is therefore possible to arrange any desired number of electrical contacts in the elements 1 and 2 which come into connection electrically when the elements 1 and 2 are done up.

As can readily be seen the releasable male and female joint in accordance with the invention can however be used in the case of any other desired electric contact connections, for example also in the case of sockets in walls. In this case the embodiment shown in FIG. 1 must be changed slightly in the manner which will be familiar to those in the art. In accordance with a further modification of the embodiment shown the sprags can also be arranged directly in electrical contact making pins.

In what follows male and female joints for connecting tubes are described with reference to FIGS. 5 to 11.

The part of a scaffolding as shown in FIG. 5 comprising tubes 101 and connecting sleeves 102. The sleeves 102 can also be in the form of connectors enabling for example up to 6 tubes to be connected together. The connecting sleeves 102 possess obliquely running blind holes in which cylindrical sprags 103 are mounted. (see FIG. 6). These sprags are pressed outwards by associated springs 104. In order to avoid their falling out the openings of the holes the latter are pressed inwards somewhat by means of a center punch or the like. The diameter of the tube 101 at the radial end correspond to the internal diameter of the female sleeve 102. At a certain distance from the radial end an annular groove 105 is provided; adjacent to the groove 105 there is a part 106 in which the external diameter of the tube 101 is somewhat less than the internal diameter of the connecting sleeve 102. In the female connecting sleeve 102 a plate spring 107 may be provided in a suitable groove so as to serve as a resilient abutment for the end of the tube introduced into the sleeve.

The angle of the holes in which the sprags 103 are mounted is so selected that on insertion of one tube end into the connecting sleeve 102 the sprags 103 are pressed back of their own accord. When the end of the tube introduced into the female element abuts against the plate spring 107, the sprags 103 snap back under the action of their springs 104 outwards so that they fit into the groove 105. The tube 101 can not then be pulled out of the connecting sleeve 102. In this respect the angular setting is of no importance between the tube 101 and the connecting sleeve 102 about the common axis. Also it is of no importance whether, after the introduction of the tube 101, the tube is turned in relation to the sleeve.

In order to undo the connection or joint the wrench shown in FIG. 7 can be used. A sleeve segment 109 is provided from each of the two limbs 108 of the wrench in order to form the joint releasing element. The wrench is placed so that the two segments 109 come to lie against the tube end to be undone. The wrench is then closed and introduced into the annular space 110 between the connecting sleeve 102 and the part 106 of reduced diameter on the tube end. In this manner by means of the wrench the sprags 103 can be pressed backwards so that the tube 101 can be drawn out of the connecting sleeve 102 again.

Instead of the spring 107, as shown in FIGS. 8 and 9 it is also possible to make use of an elastic sealing part 111. Such a connection is more particularly useful in the case of the construction of long pipe lines for liquids and gases.

Figure 10:
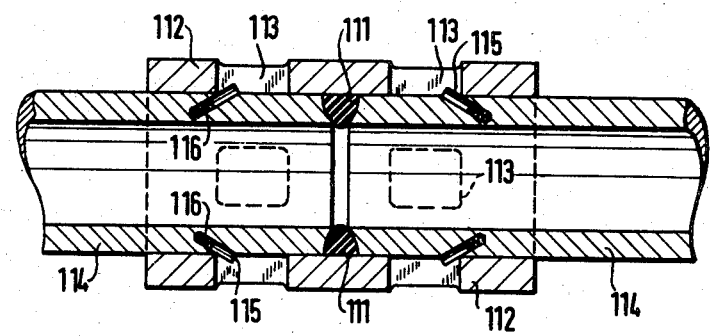
FIG. 10 is a section through an embodiment of the invention which has been modified with respect to FIG. 9.
Figure 11:
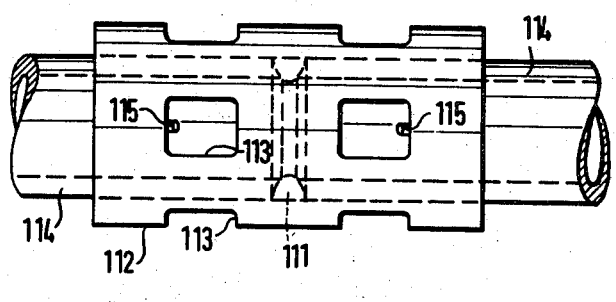
FIG. 11 is a plan view of the embodiment in accordance with FIG. 10.

In the embodiment shown in FIGS. 10 and 11 the sprags are not accommodated in the connecting sleeve but in the tubes. This offers the advantage that the tube ends do not have to be reduced or increased in diameter. The tubes are, however, not capable of being turned in relation to each other freely. Consequently the construction shown here is also suitable for constructing strings of tubes for boring into the ground, or other shaft connections.

Considering the details of the construction it can be seen that a connecting sleeve 112 is provided with windows or openings 113. If tubes 114, which are provided with sprags 115, are introduced into the connecting sleeve 112, the sprags 115 are pressed back against the action of the springs 116 associated with them. In the openings 113 the sprags 115 snap outwards and come to lie against the outer wall of the window or opening 113 in a self-locking manner. The connection can be undone by pressing the sprags 115 backwards. In this case the use of a wrench-like tool is convenient, by means of which several sprags can be simultaneously engaged.

It will be understood that the connecting sleeves 102 and 112 can be directly connected with tubes to be connected together, that is to say an end of the tube can be so constructed that it can be placed around the end of another tube.

As will be readily apparent in the case of the embodiments in accordance with FIGS. 6 and 9 the release of the sprags can be carried out with any other suitable tool which can be introduced into the annular space 110, for the wrench in accordance with FIG. 7 only constitutes a particularly convenient form of a tool for undoing joints. Furthermore it is possible to arrange on the end of the tube, which has the part of reduced diameter, that is to say adjacent to the annular space 110, a cylindrical sleeve which can slide axially on the tube 101. This cylindrical sleeve is always on the tube and is thus always available for releasing the sprags, something which can be carried out by a short axial movement. As can readily be seen, the wall thickness of the cylindrical sleeve needs at the most only to correspond to the width of the annular space 110.

As can readily be seen in the case of the male and female connections or joints in accordance with FIGS. 6 to 11 instead of the tube forming the male part it is also possible to use a solid male part.

In the case of all embodiments of the invention it is possible to arrange for the holes in which the sprags are arranged so that their axes are not oblique in relation to the longitudinal axis of the joint but in such a manner that the axes of the sprag and the of the joint form a right angle between them. In this case the sprags must be provided on their end face extending from the recess with an oblique surface so that a pushing back into the release position is possible.

In accordance with a further modification of the embodiment of the invention described it is possible to provide more than one or two sprags so as to be distributed peripherally with an even spacing either in the male or in the female element.

I claim:

1. A releasable joint comprising:
   a. a female element having a through hole, said through hole having a first part of first cross-section and a second part of an enlarged second cross-section, said first and second parts being connected by an offset wall;
   b. a male element lying at least partially within said female element, said male element having a recess adjacent said offset wall;
   c. a compression spring having one end connected to the base of said recess;
   d. a sprag connected to the other end of said spring and mounted for axial movement in said recess, said spring urging said sprag outwardly of said recess to abut against said offset wall; and
   e. releasing means for pushing said sprag into said recess against the action of said spring, said releasing means comprising a sleeve which surrounds said male element within said second part and is axially movable therein and a plate at one end of said sleeve wherein said plate may be pushed to move the other end of said sleeve against said sprag so as to compress said spring.

2. A joint as claimed in claim 1 in which the recess containing the sprag is oblique in relation to the longitudinal axis of the male and female elements and narrows at its outer end.

3. A joint as claimed in claim 1 in which the male element is a coupling plug and the female element is a coupling socket.

4. A joint as claimed in claim 1 in which the male element is an electrical contact pin.

5. A joint as claimed in claim 1 in which the plate is made integrally with the sleeve.

6. A joint as claimed in claim 1 in which the male and female elements and the sleeve and the plate are constructed cylindrically and are coaxial in relation to the through hole.

7. A joint a s claimed in claim 1 in which the sprag only extends sufficiently out of the recess for its end face to be engaged by the sleeve.

8. A joint as claimed in claim 1 in which the sprag is in the form of a solid cylindrical peg.

9. A joint as claimed in claim 1 in which the bore of the female element has a groove running axially and in which the male element is arranged for rotation in order to release the joint.

10. A joint as claimed in claim 1 in which the male element has at least one end a slot for receiving a screwdriver.

11. A joint as claimed in claim 1 in which the male element has at least one sleeve for fixing the male element in a wall.

12. A joint as claimed in claim 1 in which the male element is pin-shaped and is provided with a sprag adjacent to each of its ends.

13. A joint as claimed in claim 1 in which the male element is pin-shaped and is provided with grooves for engagement with a slotted washer for attachment to a wall.

14. A joint as claimed in claim 1 in which the offset wall of the female element is in the form of a helically annular face.

15. A joint as claimed in claim 1 in which the male element is solid and has a circular cross-section.

16. A joint as claimed in claim 15 in which the male element is in the form of a pin and has a portion shaped for cooperation with a wrench.

* * * * *